United States Patent
Happel et al.

(10) Patent No.: US 6,546,893 B1
(45) Date of Patent: Apr. 15, 2003

(54) MILKING CUP

(76) Inventors: Fritz Happel, Kramerweg 4, D-87650 Baisweil (DE); Werner Happel, Muhlweg 4 a, D-87654 Friesenried (DE)

( * ) Notice: Subject to any disclaimer, the term of this patent is extended or adjusted under 35 U.S.C. 154(b) by 0 days.

(21) Appl. No.: 09/786,519

(22) PCT Filed: Sep. 7, 1999

(86) PCT No.: PCT/DE99/02834

§ 371 (c)(1),
(2), (4) Date: Apr. 5, 2001

(87) PCT Pub. No.: WO00/13489

PCT Pub. Date: Mar. 16, 2000

(30) Foreign Application Priority Data

| Sep. 7, 1998 | (DE) | 198 40 732 |
| Oct. 19, 1998 | (DE) | 198 47 912 |
| Mar. 22, 1999 | (DE) | 199 12 615 |

(51) Int. Cl.⁷ ................................................ A01J 5/04
(52) U.S. Cl. ........................................ 119/14.47; 119/14.49
(58) Field of Search ............................ 119/14.01–14.55

(56) References Cited

U.S. PATENT DOCUMENTS

| 1,312,941 A | * | 8/1919 | Anderson | 119/14.47 |
| 2,502,362 A | * | 3/1950 | Babson et al. | 119/14.47 |
| 2,621,626 A | * | 12/1952 | Harris et al. | 119/14.47 |
| 2,997,980 A | * | 8/1961 | Noorlander | 119/14.47 |
| 3,255,732 A | * | 6/1966 | Raht | 119/14.47 |
| 3,476,085 A | * | 11/1969 | Noorlander | 119/14.47 |
| 3,659,558 A | | 5/1972 | Noorlander | |
| 3,659,598 A | | 5/1972 | Peters et al. | |
| 3,696,790 A | | 10/1972 | Albright | |
| 4,200,058 A | | 4/1980 | Happel | |

FOREIGN PATENT DOCUMENTS

| CH | 628 496 A5 | 3/1982 |
| DE | 198 40 732 A1 | 3/2000 |
| DE | 198 47 912 A1 | 5/2000 |
| DE | 199 12 615 A1 | 9/2000 |
| EP | 0 266 809 A1 | 5/1988 |
| EP | 0 593 563 B1 | 4/1994 |

* cited by examiner

*Primary Examiner*—Charles T. Jordan
*Assistant Examiner*—Judith Nelson
(74) *Attorney, Agent, or Firm*—Oliff & Berridge, PLC

(57) ABSTRACT

A teat cup comprising a liner having movable thin-wall portions which are adapted to be differently pressurized is disclosed.

22 Claims, 9 Drawing Sheets

MILKING CUP

The invention relates to a teat cup in accordance with the preamble of claim 1 and an appropriate liner.

Such a teat cup disclosed, for instance, in CH-PS 628 496 includes a teat cup sleeve in which a liner is accommodated.

In order to achieve a safe opening in the suction cycle, the known liner is clamped in the teat cup sleeve, a liner head being fixed to an upper clamping position of the teat cup sleeve, while the end portion distant from the liner head is fixed to a lower clamping position. This end portion of the liner is connected to a negative pressure source, for instance a vacuum pump, via a milk hose. An exterior space to which negative pressure or atmospheric pressure can be applied via an appropriate connection is formed between the teat cup sleeve and the liner clamped therein. By increasing the pressure in the exterior space vis-à-vis the teat receiving space defined by the liner the circumferential walls of the liner can be brought into contact with the teat section by section during the massage phase.

In the known solution a closing means is provided in the milk hose connected to the liner via which closing means the connection to the negative pressure source can be shut off or throttled. This closing means is realized by a membrane-like configuration of the milk hose wall.

It is a drawback of this known teat cup that in the interior space below the teat there remains a relatively large volume, because the shut-off from the vacuum is only effected in the subsequent milk hose. The relief of the teat from the vacuum is impeded by the relatively large volume.

When using known teat cups having normal-wall liners, it has turned out that due to an infavourable strenuous massage of the teat by the walls of the liner an optimal milking is not ensured especially in the case of sensitive cows of modern breedings.

In order to eliminate this drawback, it is suggested in EP 0 593 563 B1 to design the liner to have a comparatively small wall thickness. Although this thin-wall liner is adapted to prevent the teat from being overstrained even in the case of sensitive cows, however, it is difficult that due to the thin wall an opening of the liner required for the milk withdrawal in the suction phase is not ensured. Moreover neither a desired sequence control of the massage nor an optimum sealing at the teat can be achieved by such thin-walled liners.

In U.S. Pat. No. 3,659,598 a liner having reinforced wall portions and intervening thin-wall portions is disclosed.

Compared to this, the object underlying the invention is to provide a teat cup and an appropriate liner which can also be used with sensitive cows and in which the opening during the suction phase and an optimum sealing and adhesion during the massage is ensured.

This object is achieved, with respect to the teat cup, by the combination of features of claim 1 and, with respect to the liner, by the combination of features of claim 20.

In accordance with the invention, in the hose part of the liner receiving the teat thin-wall portions are formed which permit a punctual or area-restricted massage of the teat or a closing to the negative pressure source.

Due to the support via the thick-wall portions of the liner, the thin-wall portions can be designed such that even with a clamped liner and a pressure compensation in the interior and exterior spaces only a negligible longitudinal tension is applied thereto so that a radial excursion of the membrane-shaped thin-wall portions is supported.

Moreover, the adhesion of the teat cup to the teat can be improved by a suitable positioning of these thin-wall portions so that the liner can be prevented from both slipping off and climbing during milking.

A possibly required axial tension or restoring force in the almost circular cross-section of the liner during the suction phase can be assumed by the thicker wall portions or anchoring, supporting or web members. The thin-wall portion mainly serves for massage or for closing and supporting the teat and is designed so that the thin-wall portion is either extremely extensible at least in one direction between two thicker wall portions, anchoring, supporting or web members or has a greater length than the direct distance between the anchoring, supporting or web members.

The drawbacks regarding adhesion and massage existing with conventional teat cups are largely eliminated by the use of thin-wall portions designed according to the invention in a teat cup, a good adhesion of the teat cup to the teat not causing any constriction is achieved and at the same time it is possible to improve the course of massage physiologically by stopping the massage upon the beginning of the suction cycle first at the teat base and then at the tip of the teat.

The use of thin-wall portions according to the invention for massaging the teat also permits to utilize the quick reaction of such thin-wall portions to differences in pressure and thus provides the opportunity to carry out an intensive stimulation at high pulse frequencies. Such a stimulation of vibration is especially effective, because it can be effected while simultaneously closing the vacuum from the teat receiving space. This is in contrast to the conventional method in which the teat is stimulated under vacuum.

Such thin-wall portions in the liner receiving area can fulfill various tasks depending on the constructional arrangement, they can have an annular shape and can be dented in the longitudinal section or undulated and/or can have different wall thicknesses with respect to each other. The teat receiving area is considered to be that part of the liner which is suited for receiving the teat in terms of diameter. This area may have a greater axial length than the teat, however.

In order to improve the adhesion, a thin-wall portion is used, e.g. above the clamping of a teat cup sleeve below the liner head or directly below an inserting ring, wherein atmosphere is applied to the outside of the thin-wall portion or the latter is adjacent to a closed exterior space by the volume of which the extension of the thin-wall portion can be influenced (FIGS. 4, 6, 7). The exterior space adjacent to the outside of the thin-wall portion may be an annular space or a chamber. A common exterior space may be assigned to plural thin-wall portions.

If the head is supported close to the thin-wall portion, the head remains more movably (FIG. 4). It is also possible to apply a control pressure to this exterior space by means of a connecting line so that a difference in pressure from the teat receiving space (interior space) is brought about. So, e.g. in the event of a drop of vacuum in the interior space or an undesired change of position of the teat cup, an excessive pressure can be controlled to be introduced so that an immediate contact of the thin-wall portion with the teat is obtained.

If this chamber is connected to the pulsation of a pulsator, such a thin-wall portion can be used to improve the adhesion, massage or stimulation, because especially at the beginning of the massage cycle it brings about an earlier contact with the teat by applying a differential pressure from the teat receiving space to the outside without causing a constriction of the teat at the base. Axially seen, there can also be effected a time sequence of the contact with the teat and the massage of the teat by the liner, resp., by the fact that, e.g., seen from the teat base downwards the successive hose portion of the liner restricting the teat receiving space has a appropriately thicker wall or changes to a smaller diameter. If necessary, in the hose portion the folding direction with respect to the cross-section can be defined by ribs or different wall thicknesses or an oval shape.

Furthermore, plural ones of the thin-wall portions according to the invention can be arranged axially one beneath the other so that they become effective over the entire teat area. Exterior spaces can be assigned to the thin-wall portion so that a sequence control can be executed in that the latter interconnects exterior spaces assigned to one or more thin-wall portions through conduits or bores, advantageously provided with possibly different throttle elements. Likewise the individual exterior spaces of the thin-wall portions can be separately controlled.

According to another embodiment of the invention a plurality of small-area thin-wall portions is radially and axially spread over the teat receiving area in the hose part of a liner, wherein these thin-wall portions can be predetermined as to their shape and are preferably designed to be circular or oval. It can moreover be advantageous to arrange these thin-wall portions spread like a net over the entire teat receiving area of the hose part (FIG. 4).

It is another embodiment of the invention to design these thin-wall portions as longitudinal paths between thicker-wall webs preferably in the teat receiving area of the hose part, wherein in this case the thin-wall portion can also be axially tensioned, if the same is radially movable or dented between the longitudinal webs, wherein, seen in cross-section, one or more of such thin-wall portions can be distributed to be juxtaposed at the periphery.

The thin-wall portions according to the invention permit the design of a teat cup without the previously usual exterior space between the circumferential wall of the liner and the inner circumferential wall of the teat cup sleeve. In this embodiment the massage is exerted solely through the thin-wall portions to which alternately a vacuum or atmosphere and/or pressurized air is applied through a duct by means of a pulsator control. The other teat reception can be surrounded without clearance by a sleeve of a rigid or flexible material which is closely adjacent to the teat cup sleeve or can be designed to have an inherent stability due to an appropriate dimensioning of the wall. A teat cup designed in this way has the additional advantage of an easier handling by the considerably smaller diameter (FIGS. 6–11).

It is especially advantageous if the liner according to the invention is provided with a closing by which the connection to the negative pressure source can be throttled or shut off. According to the invention, this throttling or shut-off of the connection is effected via one of the thin-wall portions of the liner formed in the teat receiving area.

Although it is known per se already from the prior art according to CH-PS 628 496 mentioned in the beginning to provide a closing between the negative pressure source and the liner, however this closing is formed in the milk hose which is formed, depending on the embodiment, following the liner or else in the area between the negative pressure source and a claw. By the solution according to the invention to integrate this closing into the teat receiving area, the volume in the interior space below the teat to the closing element can be considerably reduced to shut off the vacuum. Moreover, in the solution according to the invention the thin-wall portion may assume a double function which, on the one hand, consists in shutting off the closing and, on the other hand, in the massage of the teat.

The closing is formed at a distance below the teat in the interior of the liner.

A preferred embodiment illustrates a closing having an at least substantially annular and dimensionally stable sealing or support face which is located obliquely with respect to the longitudinal axis of the liner and a closing wall opposed to this face and getting in contact with the same in the relieving cycle, the closing wall being formed by a thin-wall portion of the liner or by a planar closing element which is supported by the thin-wall portion of the liner or is integrated in the same.

Milking methods which relieve or at least strongly reduce the vacuum at the teat during the massage cycle have great advantages, as is known, regarding the health of the udder and the milk yield. The design according to the invention of a closing located directly below the teat receiving area excels by a particular simplicity and functional safety and ensures a free flow during the milk discharge and during cleaning. Accessory parts which are disturbing in practice and possibly have to be cleaned separately are avoided. It is further especially advantageous that, on the one hand, during the massage cycle a relief of the teat is achieved by an at least extensive closing from the vacuum and, on the other hand, a troublefree milk flow is ensured in the relieving phase of the teat from the vacuum. This is a consequence of the fact that when no milk is flowing a total closing is possible, however, in the case of milk flow, the closing member initially closes only the liquid-free cross-section of the passage and thus the milk can flown off even when the teat is relieved from the vacuum.

This closing may be designed so that the thin-wall portion that effects the closing is simultaneously used for massaging the teat, wherein in this case this thin-wall portion may have an increasing or decreasing wall thickness toward the teat.

It is further possible to ventilate the teat receiving space with atmosphere by means of a duct passed by the closing.

It is a particularly advantageous possibility of the closing according to the invention to obtain a periodical ventilation, which communicates the space below the teat with atmosphere in the suction cycle and thus causes a smooth discharge of the milk collected below the teat, by means of a communicating duct to the atmosphere ending in the wall of the closing face preferably with a nozzle. By this type of ventilation a clearing of the interior space below the teat in the direction of the milk flow is obtained, before the closing is shut in the subsequent massage cycle. When closing the teat receiving space from the vacuum, at the same time the communicating duct can be closed by the thin-wall portion and/or by the closing member, wherein the opening of the communicating duct may be surrounded by an annular ring.

It is also possible to use a flexible elastic nozzle projecting toward the thin-wall portion so that there is also the possibility of a mechanical cleaning by contacting the flexible nozzle through the thin-wall portion or the closing member. This embodiment is particularly advantageous if the closing according to the invention is manufactured as a component of an extruded part.

As an alternative, a cleaning pin adapted to be introduced into the nozzle bore from outside and being movably guided in the teat cup may be assigned to the nozzle.

Depending on the arrangement of the opening of the communication to the atmosphere into the oval annular face of the closing, a change concerning the time of opening or closing of the communicating duct and thus also a change of the admitted air quantity (A/min) is obtained. Concerning the milk quality, large air quantities are not desired, as they entail the formation of free fatty acids. Due to the periodical intake of air directly below the teat it is possible to manage with relatively small air quantities.

This type of ventilation in the suction cycle has further advantages, because the ventilation is effected directly below the teat and thus even in the case of high milk flow there occurs no hydraulic effect which requires large cross-sections of the discharging milk conduit in the previous teat cups and makes such a milker very bulky.

With this type of periodical ventilation in the suction cycle only normal cross-sections, as shown in FIG. 4, of the milk conduit leading away from the teat cup which correspond to the milk flow are required so that a milker of this type is particularly easy to handle.

By arranging a valve in the communicating passage to the atmosphere a periodical ventilation is possible also in the massage cycle.

In all liners having one or more thin-wall portions a defined folding during massage is advantageous. This can be achieved by the relation of the wall thicknesses to each other or by an oval shape of the cross-section, or else by an appropriate contact with the inside of the teat cup sleeve. It can be necessary in this context to provide a twisting protection between the teat cup sleeve and the liner by meshing projections and recesses.

In order to obtain a further increase in stimulation the surface of the inside of such a teat cup including thin-wall portions can obtain, e.g., a rough surface structure which stimulates the teat wall similarly to the surface of a calf's tongue.

Further developments of the invention are the subject matter of the further subclaims.

The invention and particular features of the invention will be explained hereinafter with reference to the drawing by way of embodiment, in which.

Figure 12:
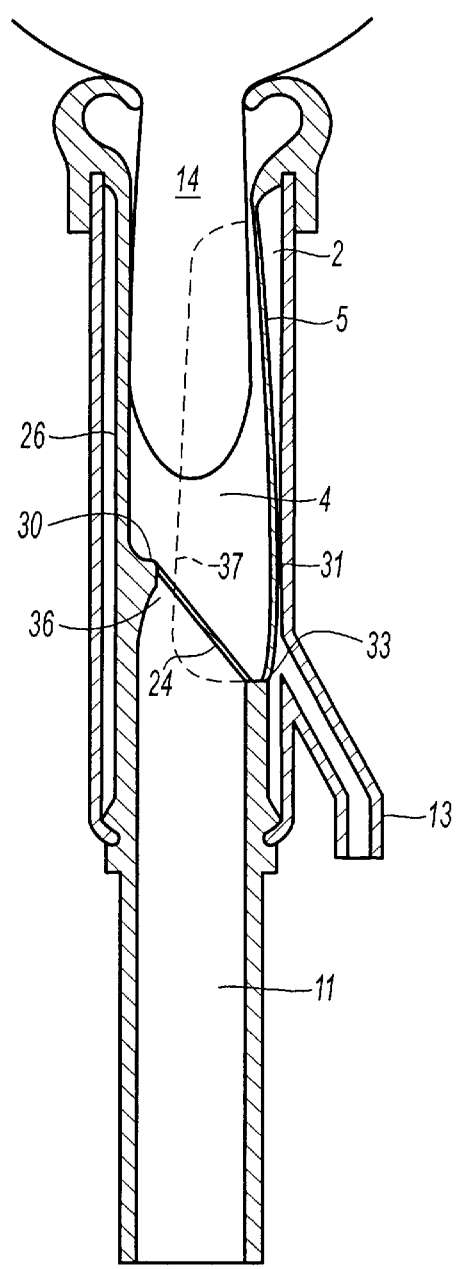
Figure 13:
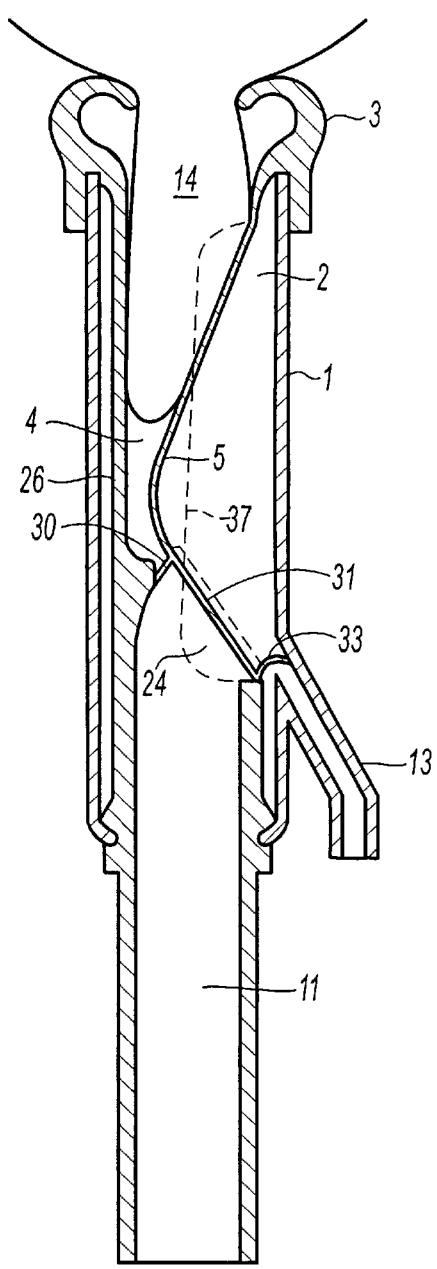
Figure 14:
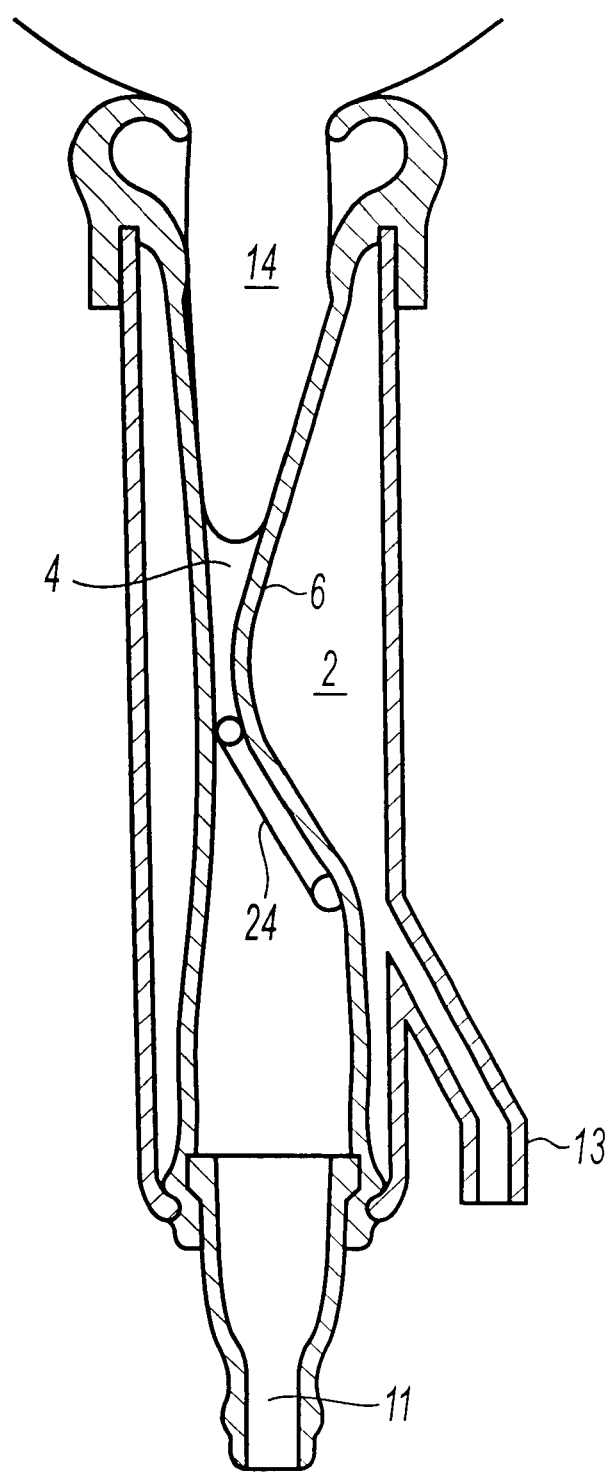
Figure 15:
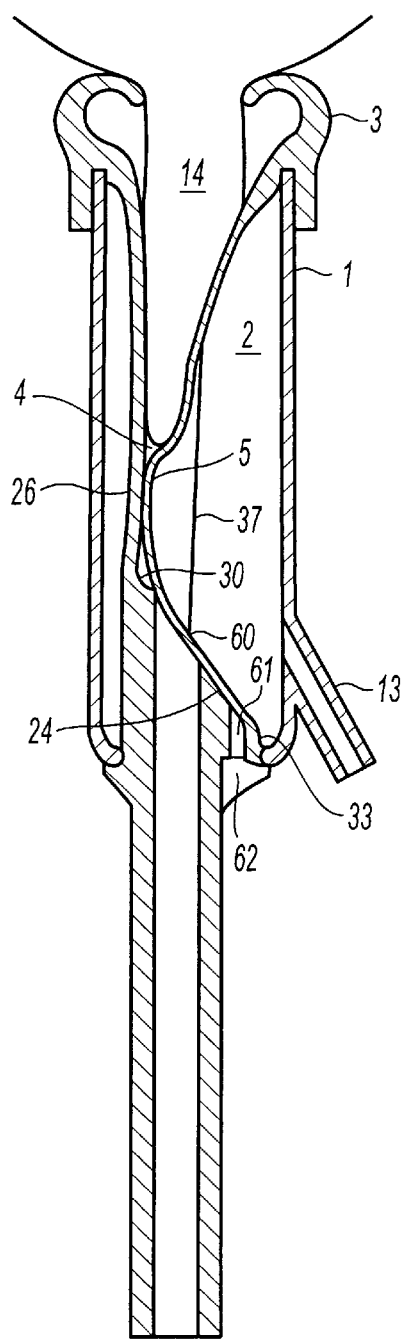
Figure 16:
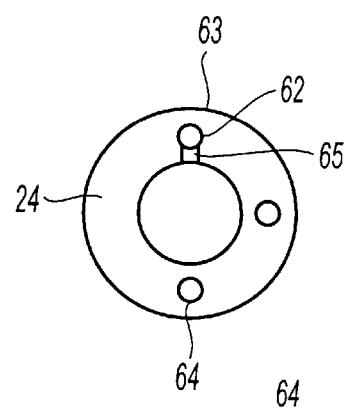
Figure 17:
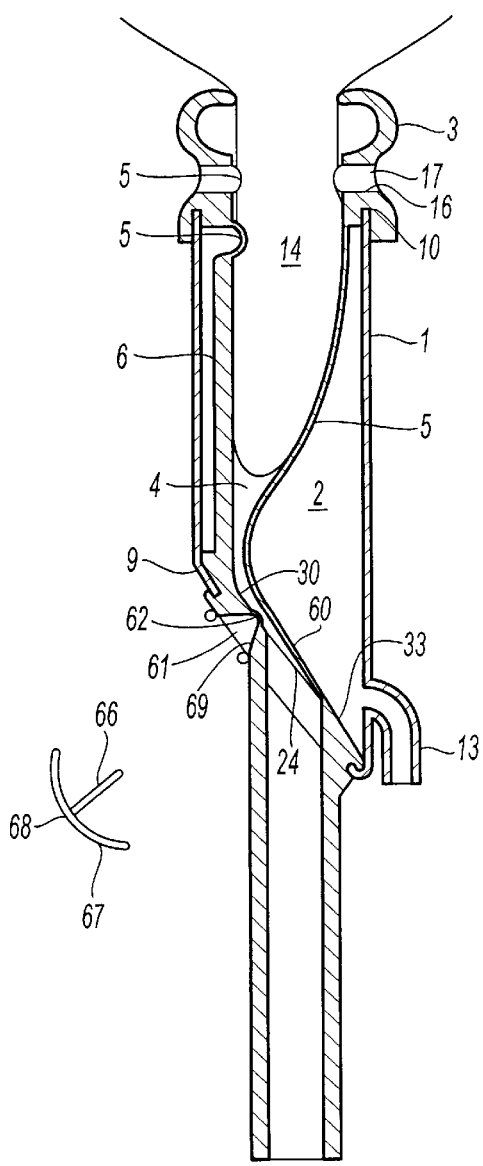
Figure 18:
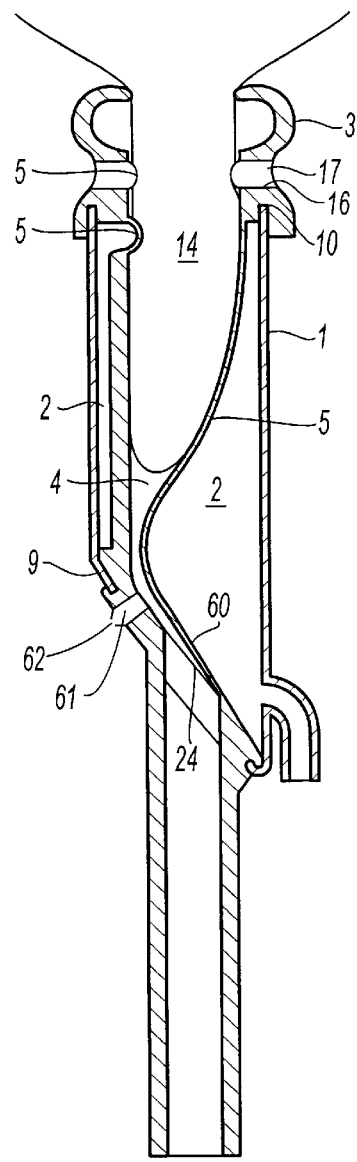

FIGS. 12 and 13 shown an embodiment of a teat cup according to the invention in the suction and/or massage cycle including a closing at the negative pressure side which can be closed via a partial section of a thin-wall portion;

FIG. 14 is a variant of a liner having an integrated closing, wherein the hose part below the closing may also be flexible;

FIG. 15 is a variant of the embodiment shown in the FIGS. 12, 13, wherein in a supporting surface constituting the closing a communicating passage to the atmosphere is formed;

FIG. 16 is a top view on the supporting surface of the closing of FIG. 15;

FIG. 17 shows a variant of the embodiment represented in FIG. 15 in which a nozzle arched toward the thin-wall portion to which a movable cleaning pin is assigned is formed in the communicating passage and FIG. 18 is a variant of the embodiment represented in FIG. 16 in which a nozzle of the communicating passage arches out of the outer circumferential surface of the teat cup.

Figure 1:
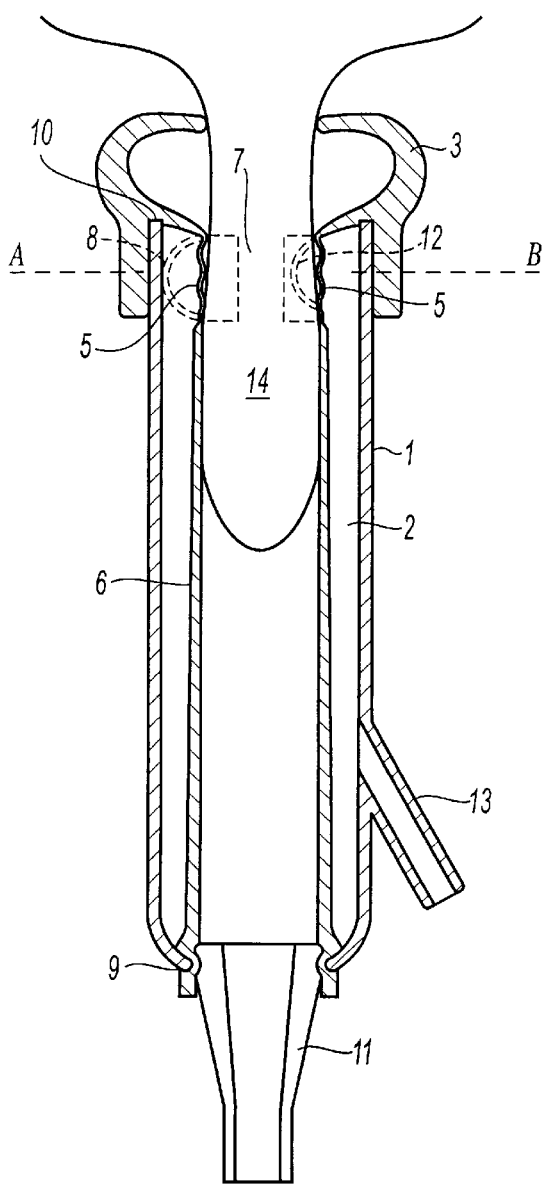
FIG. 1 shows a schematic representation of a first embodiment of a teat cup according to the invention in the suction cycle including thin-wall portions formed at the side of the teat head in the area of a clamping position.

FIG. 1 shows an embodiment of a two-chamber cup in the suction cycle in which a liner is clamped with a head 3 in a teat cup sleeve 1 between the clamping positions 9 and 10 such that the known exterior space 2 is formed which is connected via a connection piece 13 with a pulsator control and is alternately supplied with vacuum or atmosphere or with excess pressure. The interior space 4 is connected via a connection 11 to a milk hose to which a negative pressure source is connected.

A thin-wall portion 5 is provided directly below the upper clamping position 10 of the teat cup sleeve 1, wherein the thicker wall portions 7 (in dashed line) which are adjacent to a thin-wall portion 5 in circumferential direction of the liner support the thin-wall portions 5 so that in the home position a longitudinal tension of the thin-wall portions 5 is largely prevented.

This embodiment shows an arrangement of thin-wall portions 5 which are disposed diametrally with respect to each other and are turned inwards without a differential pressure in this example or are undulated 12 (dashed line). In the suction cycle (FIG. 1) the exterior space 2 is under vacuum, while in the interior space 4 almost atmosphere is prevailing as long as the teat cup is not yet put on the teat so that a contrary denting 8 (dashed line) of the thin-wall portion to the outside is effected and is supported by the teat cup wall 1 and in this way it is possible to easily put the teat cup on the teat. When put on the teat 14, in the suction cycle a vacuum is prevailing in the interior space 4 just as in the exterior space 2. The thin-wall portion 5 is thereby brought into contact with the teat 14.

Figure 2:
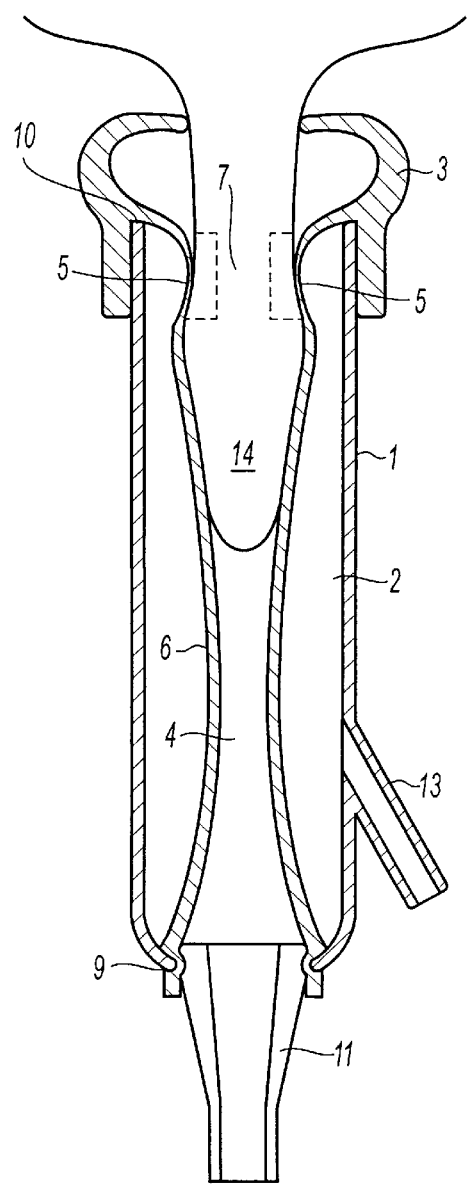
FIG. 2 shows the teat cup of FIG. 1 in a massage cycle.

FIG. 2 shows the embodiment according to FIG. 1 in the massage cycle. The exterior space 2 is under atmospheric or excess pressure. The differential pressure to the interior space leads, upon the beginning of the massage cycle, to an immediate contact with or pressure reaction of the thin-wall portions 5 to the teat. The collapsing of the other hose part 6 of the liner toward the lower clamping end 9 can be effected with delay depending on the constructional design, i.e. by reducing the diameter or by a thicker wall. That is, by an appropriate coordination of the wall thicknesses and the diameters of the liner the contact of the thin-wall portion 5 with the teat 14 and the collapsing of the liner can be effected at a time difference. In the embodiment shown in FIG. 1 the thin-wall portions are formed in the area of the upper clamping position 10 and thus contribute to fixing the teat 14 so that it can be prevented from climbing.

Figure 3:
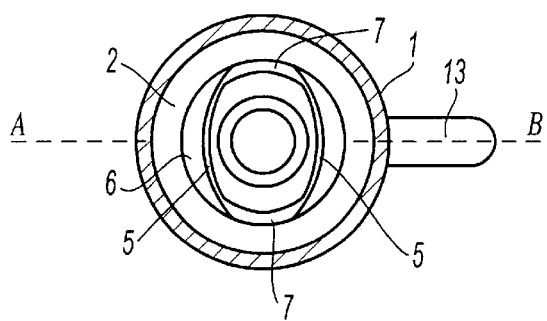
FIG. 3 is a section along the line A–B in FIG. 1.

FIG. 3 shows a section A–B of FIG. 1 with two thin-wall portions 5. Likewise one or more of such thin-wall portions 5 can be used at equal or different heights. The anchoring webs or thicker wall portions 7 which largely ensure the longitudinal stress relief of the thin-wall portions with the liner being clamped may be either wider or narrower.

Figure 4:
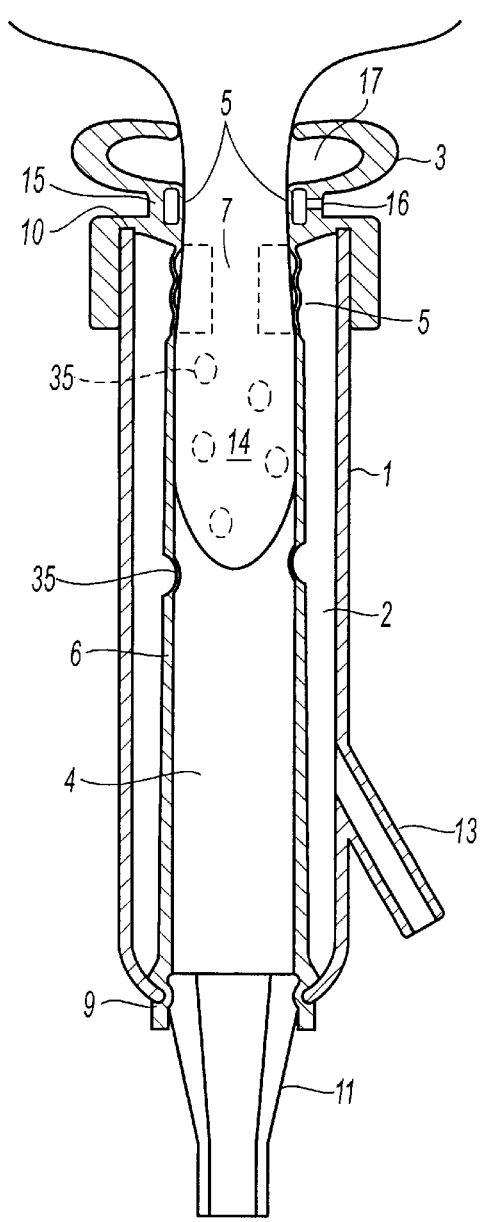
FIG. 4 is another embodiment of a teat cup having a thin-wall portion above the clamping position at the liner head, a thin-wall portion formed in the area of the clamping position and a thin-wall portion formed at an axial distance below the clamping position.

The embodiment according to FIG. 4 shows the arrangement of a thin-wall portion 5 above the clamping position 10 of the liner in the teat cup, namely in the suction cycle. In this case the thin-wall portion 5 may also be ring-shaped, because it is held relieved from longitudinal stress by a supporting ring 15 which may also consist of a different material, e.g. synthetic material. The thus formed exterior space 17 adjacent to the thin-wall portion 5 can be closed or be communicated with the atmosphere, e.g., via a bore 16. If desired according to the construction, the exterior space 17 can also be connected to a pulsator control via the bore 16.

With this design the upper thin-wall portion 5 has the duty to act in a sealing manner at the teat in the case of an upwards creeping vacuum between the teat 14 and the liner wall. Further thin-wall portions 35 are distributed at an axial distance below the upper thin-wall portions 5 along the teat receiving space. These further thin-wall portions may have, for instance, a circular, knob-like or other shape and improve the adhesion to the teat 14. In the exterior space 2 and in the interior space 4 a vacuum is prevailing in the suction cycle.

Figure 5:
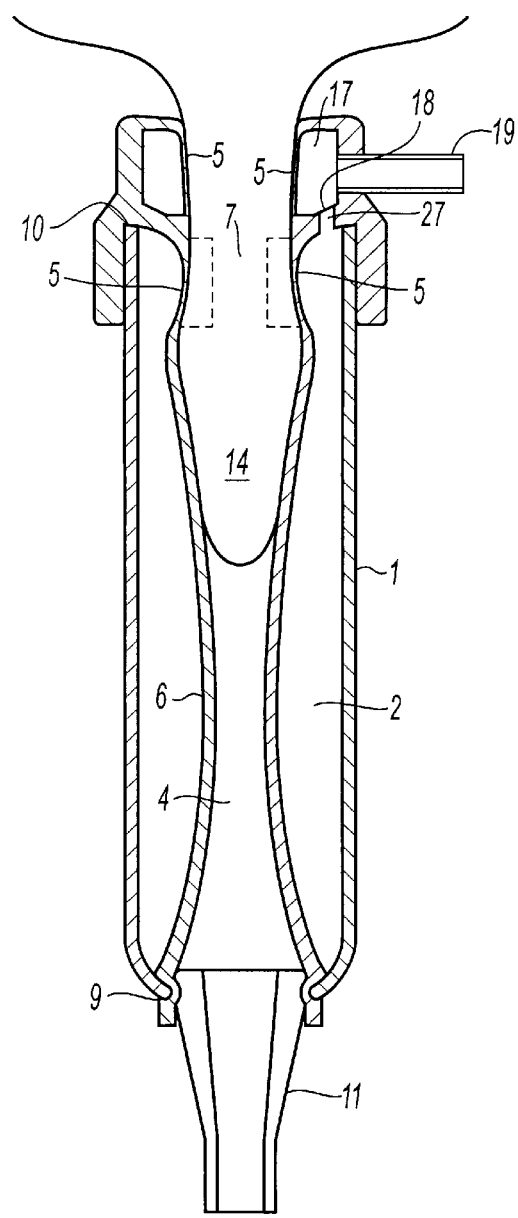
FIG. 5 shows a variant of the embodiment represented in FIG. 4, wherein a control pressure can be applied to the exterior space adjacent to the thin-wall portion at the side of the teat head.

In the further embodiment according to FIG. 5 shown in the massage cycle two thin-wall portions 5 are superimposed in axial direction in separate exterior spaces 17 and 2. The exterior space 17 is connected with the pulsation via a connection 19. In this way the possibility of a coordination in time of the course of massage and the beginning of the suction cycle is given by two separate exterior spaces 17 and 2 having thin-wall portions.

In this event, the upper thin-wall portion 5 is supported at the outside and is disposed below an inserting ring 25. It can also be inwardly dented in the unpressurized state, because before putting on the teat cup also in the suction cycle there is prevailing almost atmosphere in the interior space 11 and vacuum in the exterior space 17 so that the upper thin-wall portion 5 is outwardly dented and it is possible to put on the teat cup without difficulty.

The controlled pressures in the exterior space 17 can be transmitted into the further exterior space 2 of the teat cup via at least one communicating conduit 27, wherein the pressure build-up in the exterior space 2 can be delayed via a throttle 18. The exterior spaces 17 and 2 can also be controlled separately. Even at the beginning of the suction phase when the exterior space 17 is connected with a vacuum, the throttle 18 arranged in the communicating conduit 27 or bore causes a desired stop of the massage being first effected in the upper thin-wall portion and then in the lower massage region.

FIGS. 6 and 7 demonstrate, again in a representation of the suction cycle, by way of another embodiment the use of the thin-wall portions 5 in a teat cup having a stable wall, the thin-wall portions being enclosed by a sleeve 21 made of a rigid or else flexible material. Required communicating conduits can be arranged as a groove in the inner body or in the outer sleeve. The thin-wall portions 5 are window-shaped and are designed to be largely freely selectable as to their contour. With this design, too, an upper exterior space 17 having thin-wall portions 5 can be used which, as already described in the foregoing, serves for a sealing at the teat 14 in a closed state or communicated with atmosphere. The liner head 3 is supported by the briefly described teat cup sleeve 21 such that the thin-wall portions 5 remain stress-relieved. In this variant the teat 14 is sealed and massaged merely through the upper thin-wall portion 5 and/or the lower thin-wall portions 5 being adjacent along the teat end and having a larger axial extension. The outer wall of the liner is closely enclosed by the teat cup sleeve 21 without any clearance. The link to the pulsation is effected via a connection 13. The stable hose part 29 is connected with the negative pressure source at 11.

Figures 6, 7:
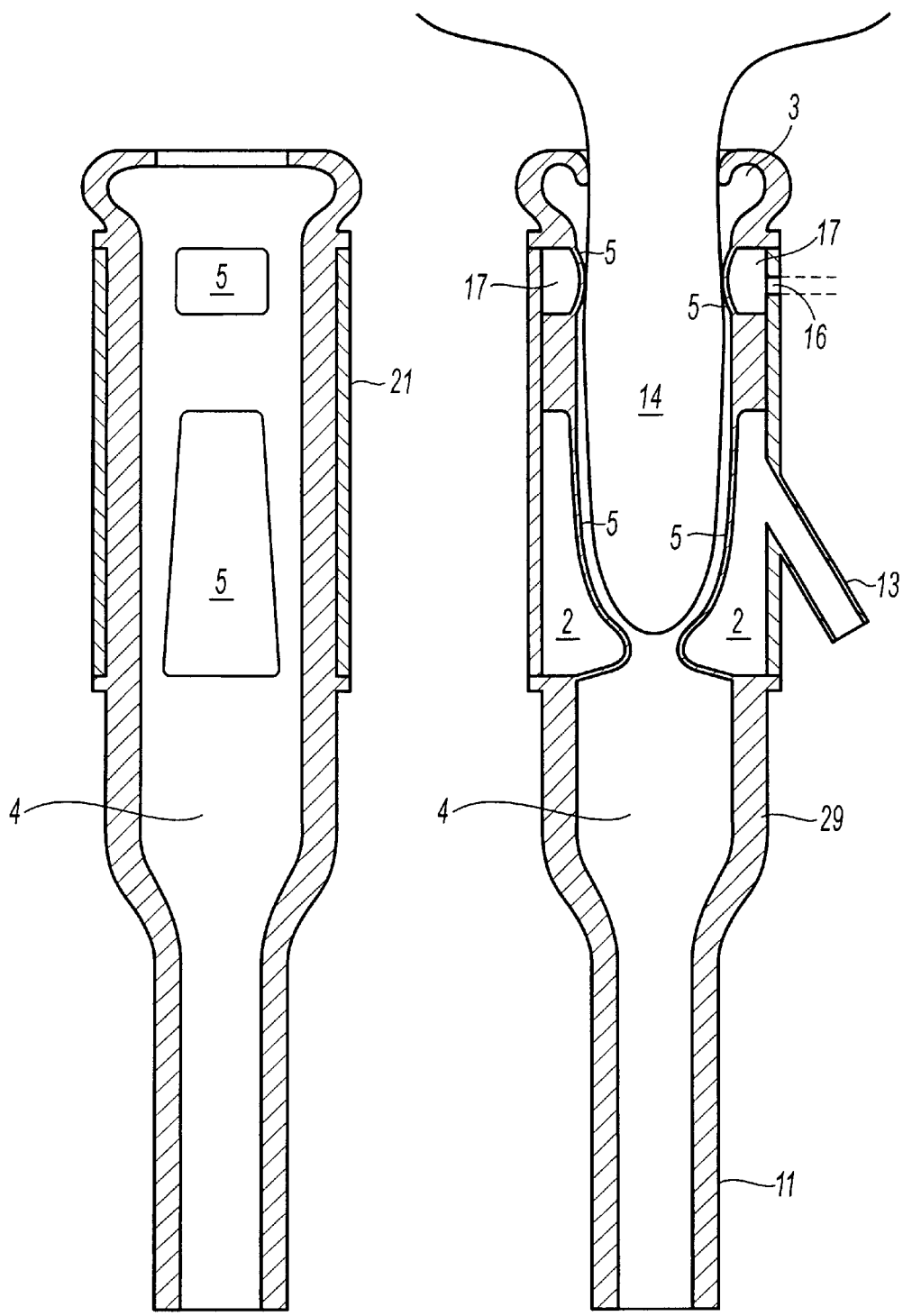
FIGS. 6 and 7 are representations of a further embodiment in which the liner is closely adjacent with thick-wall portion to a teat cup sleeve and the massage of the teat is effected via the thin-wall portions, wherein thin-wall portions are formed in the area of an upper clamping position and thin-wall portions are formed at an axial distance below the upper clamping position.
Figures 8, 9:
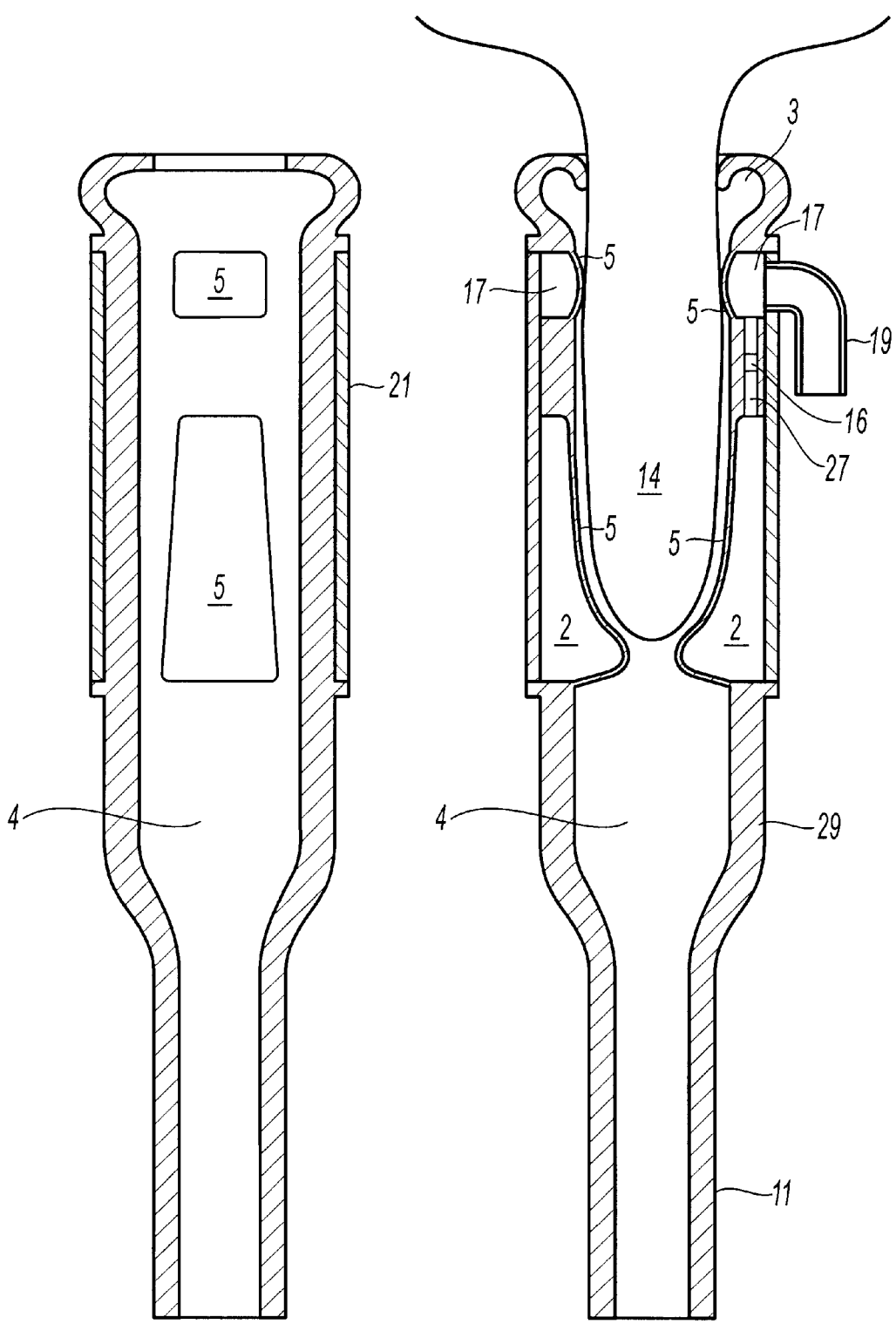
FIGS. 8 and 9 show variants of the embodiment represented in FIGS. 6 and 7, wherein a control pressure can be applied to the thin-wall portions provided in the area of the clamping position via a connection.

The FIGS. 8 and 9 slow, equally in a representation of the suction cycle, a variant of the embodiment shown in FIGS. 6, 7 in which the exterior space of the upper thin-wall portion 5 is connected with the pulsation via the nozzle 19 so that the exterior space 17 can be alternately supplied with vacuum, atmosphere or excess pressure. These pressures can be transmitted simultaneously, or preferably delayed by the throttle 18, via the communicating conduit 27 into the exterior space 2 adjacent to the lower thin-wall portions (as already described in FIG. 5). Likewise the separate exterior spaces 17 and 2 can also be separately controlled. The hose part 29 preferably has a flexible design.

Figures 10, 11:
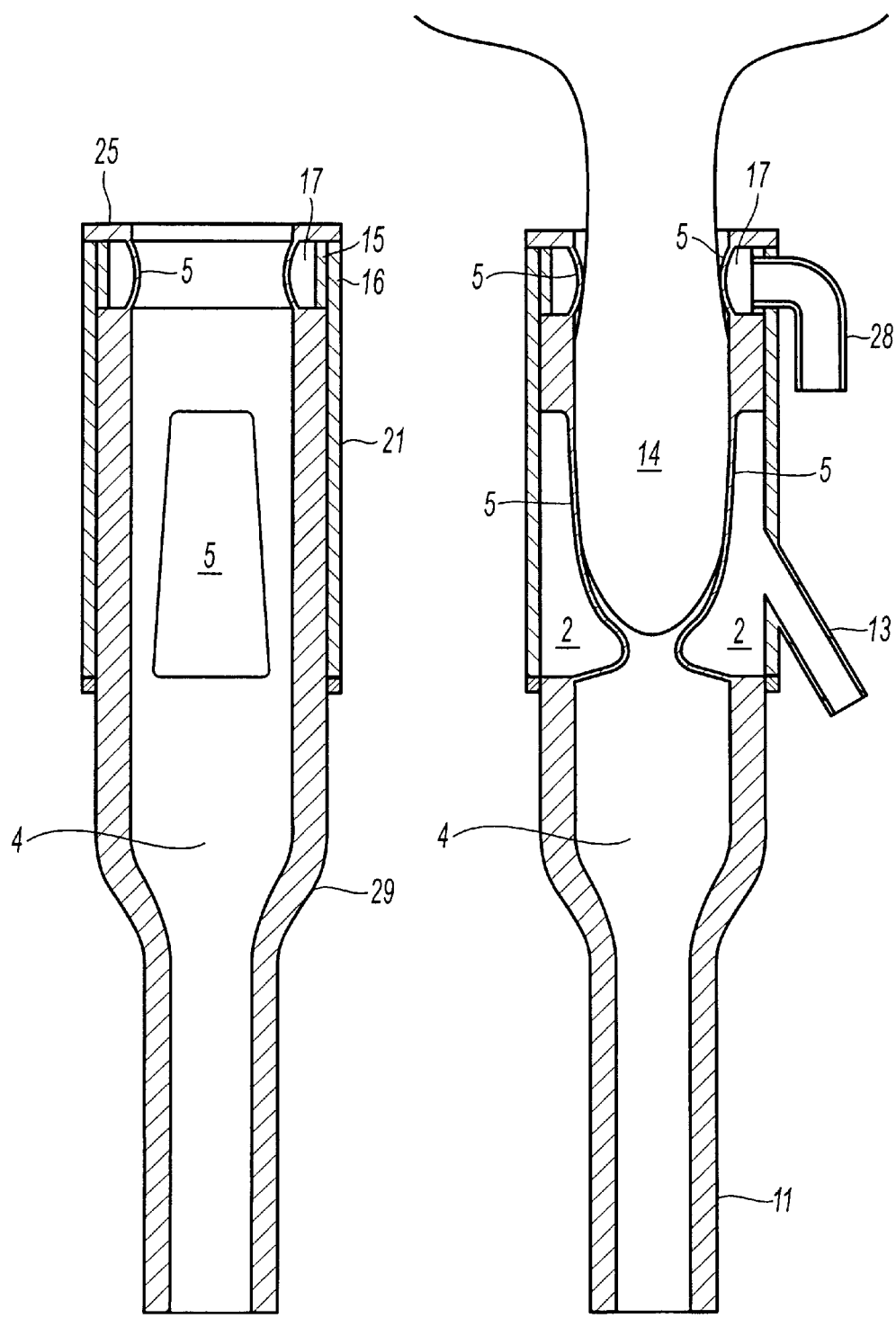
FIGS. 10 and 11 show a variant corresponding to the embodiment in accordance with FIGS. 8 and 9 in which the insertion of the teat into the teat cup is effected via an inserting ring.

The design variant according to the FIGS. 10 and 11 differs from the above-described teat cup by the fact that the exterior space 17 is formed to be located directly below an inserting ring 25 as an annular space having its own connection piece 28. The exterior space 17 and the exterior spaces 2 can be separately supplied with vacuum, atmosphere or excess pressure by the connection pieces 13 and 28. The interior space 4 is communicated with the negative pressure source. By an appropriate control via the connection pieces 13 and 28 each desired time lead or delay regarding the respective thin-wall portions 5 becoming effective can be realized.

FIG. 12 shows a particularly advantageous use of a thin-wall portion according to the invention for realizing a closing within a liner, the representation corresponding to the suction cycle.

Below the teat receiving space the liner 6 has a smaller inner diameter, wherein a supporting face 24 encompassing a closing port is formed by the difference in diameter. The closing port 24 can be shut by interaction of the supporting face 24 with the thin-wall portion acting as a closing member 31 or at least the inner clearance can be reduced so that a closing vis-à-vis the negative pressure source can be performed.

The smaller inner diameter can be arranged asymmetrically with respect to the larger diameter of the hose portion. The angle 36 of the supporting face 24 is preferably less than 90° with respect to the longitudinal axis. The supporting face 24 is advantageously designed as a toric elevation.

The wall of this embodiment is so thick below the supporting face end 30 that it does not react or only insignificantly reacts to the differences in pressure occurring during milking. The hose part 26 at the side of the teat receiving space is flexible above the closing and includes a thin-wall portion 5 extending approximately as demonstrated by the dashed line 37 and ending at the bottom supporting face end 33. In the suction cycle a vacuum is prevailing in the interior space 4 at the teat 14 as well as in the exterior space 2 so that the thin-wall portion 5 releases the closing port and exerts no massage pressure on the teat 14. In the massage cycle shown in FIG. 13 the exterior space 2 is supplied with atmosphere or excess pressure via the connection piece 13. This causes the thin-wall portion 5 to be forced inwardly in the direction of the supporting face 24 and the hose part 26 and preferably to collapse through-shaped largely over the edge of the border line 37.

Applying the thin-wall portion 5 to the annular supporting face 24 extending obliquely with respect to the longitudinal axis causes the interior space 4 to be closed off the permanent vacuum from the communication 11, wherein— as shown in FIG. 13—the teat 14 is preferably simultaneously massaged.

Along the border line 37 of the flexible other hose part the transition into the thin-wall portion 5 is effected. Due to the preferably trough-shaped design of the flexible other hose part 26 along the border line 37 it is achieved that the thin-wall portion 5 falls into this trough shape, which at the same time can cause the trough cheeks of the flexible hose part 26 to contract so that advantageously a massage is additionally exerted on the teat 14 from the trough cheeks. This course of massage equally permits a closely surrounding teat cup sleeve 1 and entails a particularly efficient massage and blood return at the teat.

The point in time of closing in connection with the subsequent reduction of volume in the interior space 4 can be predetermined by the angle 36 of the supporting face 24 with respect to the longitudinal axis of the teat cup and/or also by the height of the supporting face at 30. Also a thick-wall closing member 31 (in dashed line in FIG. 13) which is at least substantially adapted to the annular supporting face 24 regarding its dimensions can serve for this purpose at the thin-wall portion 5.

It has further to be mentioned that the principle according to the invention of a closing by interaction of an oblique ring supporting face with an appropriately flexible liner wall portion can be realized even without a massage effect in a hose part below the teat 14.

The supporting face 24 is advantageously realized as a thickened wall portion of a liner or a teat cup, the stability of the closing and/or the provision of an annular supporting face 24 can also be obtained, however, by an especially unflexible insert.

The supporting face 24 can be formed, for instance according to another design variant in accordance with FIG. 14, by a preferably integrally formed ring, the hose part being adapted to be flexible also beneath the closing. Such a closing can also be materialized in a usual liner of a double-chamber cup. By the interaction with the liner collapsing in the massage cycle—as illustrated in FIG. 14—a closing of the interior space 4 from the permanent vacuum can be obtained.

FIG. 15 shows a particularly advantageous embodiment of the closing according to the invention including a thin-wall portion 5 assigned to the teat 14 and to the supporting face 24. In this embodiment there is provided a communicating duct 61 having a nozzle 62 for communicating the interior space 4 with atmosphere in the suction cycle. In the embodiment represented in FIG. 15 the communicating duct 61 opens into the axially lower portion 33 of the supporting face 24. FIG. 15 shows this arrangement in the massage cycle, the communicating duct 61 being closed by a thin-wall portion 60. The communicating duct 61 can be provided with a nozzle 62 at the lower end toward the atmosphere or at the upper end toward the closing. The trough-shaped hose part 26 can deform in the direction of the thin-wall portion and thus be involved in the massage.

During the suction cycle the thin-wall portion 60 opens the vacuum connection 11 and the atmosphere connection of the communicating duct 61 to the teat receiving space 4 so that a rapid discharge of the milk milked in the suction cycle can be effected by the air admission. It is clearly illustrated in FIG. 15 in which way, due to the configuration and dimensioning of the thin-wall portion 5, 60, also a particularly good massage of the tip of the teat is obtained. This is very important to the health of the udder, as a protuberance of the socalled teat passage can be reduced in this way.

FIG. 16 is a top view on the supporting face 24 of FIG. 15. Accordingly, a change of the time and the duration of the ventilation can be attained by the arrangement of the air admission on the annular surface of the closing. If the communication with the atmosphere is arranged, as shown here, via the nozzle 62 in the area of the beginning 63 (at the bottom of FIG. 15) of the contact of the thin-wall portion 60 with the annular surface, the communication with the atmosphere is closed earlier. If this air admission is positioned in the direction of the end of the closing operation (at the top of FIG. 15) at 64 (dashed line), a longer opening of the communicating duct 61 and a larger inflowing air quantity is achieved. By a communicating groove 65 between the orifice of the communicating duct 61 and the closing port it can be obtained that even in the closed state of the teat receiving space from the vacuum the milk flow is ventilated by atmosphere beneath the closing. In this way it is possible to control the intake of a different air quantity with an open and shut closing depending on the design of the communicating groove 65.

The closing can also be formed, axially seen, by two inclined sides with a web being retained in the middle of the tip. In this case the communicating duct 61 is provided on one side of the inclined closing face.

The FIGS. 17 and 18 represent further embodiments of a teat cup in the massage cycle. In these particularly advantageous embodiments the lower clamping position 9 extends almost in parallel to the supporting face 24. The advantage of this solution resides in the fact that the communicating duct 61 is extremely short and therefore a contamination is largely excluded. In the embodiments shown in FIGS. 17, 18 the communicating duct 61 opens into the area of the supporting face 24 located at the top in axial direction. The transition area between the teat receiving space (hose part) and the radially stepped back connection downstream of the supporting face is designed as an inclined shoulder in which projections are formed for engaging with the end portion of the teat cup sleeve 1 extending appropriately obliquely downwards.

In the embodiment represented in FIG. 17 a nozzle 62 is formed in the communicating duct 61 by a contraction of cross-section. This contraction of cross-section can be formed, for instance, by a wall section arching toward the thin-wall portion 5 which projects from the supporting face 24.

This nozzle 62 can be cleaned by the thin-wall portion 5—or to put it more exactly, by the part 60 of the thin-wall portion supported on the supporting face 24 which gets into contact with the nozzle 62 during the massage cycle. The cleaning can be improved by a cleaning pin 68 which is mushroom-shaped in cross-section and has a cap-shaped filter 67 which can be positively caught from outside into a circumferential annular ring 69 in the orifice area of the communicating duct 61. At the filter 67 a nozzle pin 66 is formed which, in the normal state, with a non-deformed filter 67 is arranged at a distance from the nozzle. The nozzle pin 66 can be pushed into the nozzle 62 by exerting pressure on the elastic filter 67 so that the nozzle opening is cleaned. After releasing the cleaning pin 68, the same is reset to its home position by the resetting force of the filter 67.

In the embodiment shown in FIG. 18 the nozzle 62 bulges out of the outer periphery of the teat cup, wherein the elastic walls of the nozzle 62 permit an easy manual cleaning from outside. The nozzle 61 may be formed integrally with the liner or as an insert.

There is disclosed a teat cup comprising a liner having movable thin-wall portions to which exterior spaces adapted to be differently pressurized are adjacent.

| | |
|---|---|
| 1 | Teat cup wall/teat cup sleeve |
| 2 | exterior space |
| 3 | liner head |
| 4 | interior space |
| 5 | thin-wall portion |
| 6 | liner/hose part |
| 7 | wall portion/anchoring webs |
| 8 | thin-wall portion turned inwards, in dashed line |
| 9 | clamping position at the bottom |
| 10 | clamping position at the top |
| 11 | vacuum connection interior space |
| 12 | thin-wall portion turned inwards, in dashed line |
| 13 | connection piece |
| 14 | teat |
| 15 | supporting ring |
| 16 | atmosphere communication |
| 17 | annular space/exterior space |
| 18 | throttle |
| 19 | upper closing, 1$^{st}$ exterior space |
| 21 | teat cup sleeve short |
| 24 | supporting face |
| 25 | inserting ring |
| 26 | hose part above closing port |
| 27 | link |
| 28 | connection |
| 29 | stable but flexible wall |
| 30 | upper supporting face end |
| 31 | closing member |
| 33 | lower supporting face end |
| 35 | thin-wall portion (punctual) |
| 36 | angle of the supporting face with respect to longitudinal axis |
| 37 | border line of the thin-wall portion (in dashed line) |
| 60 | thin-wall portion closing |
| 61 | communicating duct |
| 62 | nozzle |
| 63 | beginning of closing operation |
| 64 | end of closing operation |
| 65 | communicating groove |
| 66 | nozzle pin |
| 67 | filter |
| 68 | cleaning pin |

What is claimed is:

1. A teat cup comprising:

a cup sleeve; and a liner having a teat receiving portion and a liner wall, inserted into the cup sleeve and forming an interior space which can be supplied with vacuum via a negative pressure source in a suction cycle, wherein one or two supporting faces of a closing to the vacuum inclined with respect to the longitudinal axis of the liner are formed below the teat receiving portion of the liner, the supporting face being adapted to be closed at least partially by an opposite thin-wall portion of the liner wall.

2. A teat cup according to claim 1, further comprising:

the closing has an at least substantially annular and dimensionally stable sealing or supporting face for the thin-wall portion or a planar closing member which is supported by the thin-wall portion or is integrated in the same.

3. A teat cup according to claim 2, wherein the thin-wall portion extends to the teat receiving portion and exerts a massage function there.

4. A teat cup according to claim 1, wherein the supporting face is formed integrally with the liner.

5. A teat cup according to claim 2, wherein the supporting face is formed by an inclined front of an insert adapted to be introduced and fixed in the liner.

6. A teat cup according to claim 1, wherein the teat receiving portion of the liner is ventilated below the closing by a communication to the atmosphere.

7. A teat cup according to claim 6, wherein the communication to the atmosphere is a communicating duct opening into the supporting face.

8. A teat cup according to claim 7, further comprising:

a nozzle consisting of a flexible material positioned in the communicating duct such that it can be pressurized by the thin-wall portion periodically contacting the supporting face.

9. A teat cup according to claim 7, further comprising:

a movable nozzle pin assigned to a nozzle of the communicating duct for cleaning.

10. A teat cup according to claim 7, further comprising:

an elastic thin-wall nozzle that projects dome-shaped at the atmosphere side from the communicating duct.

11. A teat cup according to claim 1, wherein a lower clamping position of the liner extends almost in parallel to the supporting face.

12. A teat cup according to claim 1, further comprising:

at least one thin-wall portion that is formed in the circumferential wall of a hose part of the liner determined for receiving the teat.

13. A teat cup according to claim 12, further comprising:

a thin-wall portion is arranged at least partially between wall and/or web parts of the liner having an anchoring and supporting function, respectively.

14. A teat cup according to claim 12, wherein negative pressure, atmospheric or excess pressure, can be applied to the external outer face of the thin-wall portion.

15. A teat cup according to claim 14, further comprising:

at least two axially or radially offset thin-wall portions that are formed at the liner, wherein pressures can be separately applied to exterior spaces radially adjacent thereto or the latter are communicated with each other at least partially through a duct adapted to be throttled.

16. A teat cup according to claim 1, further comprising:

a partly annular thin-wall portion that is formed in the area of the head portion of the liner above or below an upper clamping position or an inserting ring having an undulated, inwardly or outwardly turned shape in a state free of differential pressure.

17. A teat cup according to claim 15, wherein the exterior space adjacent to the thin-wall portion can be controlled by atmospheric or excess pressure preferably in response to the vacuum of an interior space of the liner located below the teat or by excess pressure in response to a change of position of the teat cup.

18. A teat cup according to claim 1, wherein the wall thicknesses of the thin-wall portion and of the thicker wall portions of the liner are selected in response to the time sequence of the phases of the milking operation, with respect to the massage phase and the closing vis-a-vis the negative pressure source.

19. A teat cup according to claim 1, wherein the teat cup sleeve and the liner are formed in one piece by appropriately selecting the wall thickness of the liner and of the thin-wall portions.

20. A teat cup according to claim 1, wherein the direction of deformation of the liner is predetermined by an appropriate selection of the wall thicknesses of the liner or the shaping of the teat cup sleeve.

21. A teat cup according to claim 1, wherein the closing is effected by arching the liner wall located at the outside of the closing.

22. A liner for a teat cup according to claim 1, further comprising:

an obliquely extending closing which can be closed by an opposite liner wall, is formed in a circumferential wall of a hose part determined for receiving the teat.

* * * * *